(12) United States Patent (10) Patent No.: US 7,153,546 B2
Tanahashi et al. (45) Date of Patent: Dec. 26, 2006

(54) PERPENDICULAR MAGNETIC RECORDING MEDIA, MANUFACTURING PROCESS OF THE SAME, AND MAGNETIC STORAGE APPARATUS USING THE SAME

(75) Inventors: Kiwamu Tanahashi, Kokubunji (JP); Atsushi Kikugawa, Higashimurayama (JP); Noboru Shimizu, Tokorozawa (JP); Yukio Honda, Fuchu (JP); Yuzuru Hosoe, Hino (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 115 days.

(21) Appl. No.: 10/790,803

(22) Filed: Mar. 3, 2004

(65) Prior Publication Data

US 2004/0170798 A1 Sep. 2, 2004

Related U.S. Application Data

(63) Continuation of application No. 10/076,655, filed on Feb. 19, 2002, now Pat. No. 6,723,457.

(30) Foreign Application Priority Data

May 14, 2001 (JP) .............................. 2001-143637

(51) Int. Cl.
 *H05B 6/00* (2006.01)
(52) U.S. Cl. ...................... 427/599; 427/598; 427/128; 428/694 TM; 428/694 TS; 428/900; 428/65.3; 428/65.7

(58) Field of Classification Search ................ 427/599, 427/598, 128; 428/694 TM, 694 TS, 900, 428/65.3, 65.7
See application file for complete search history.

(56) References Cited

U.S. PATENT DOCUMENTS

| | | | | |
|---|---|---|---|---|
| 3,868,651 | A | * | 2/1975 | Ovshinsky .................. 365/113 |
| 6,730,421 | B1 | * | 5/2004 | Kirino et al. ............. 428/831.2 |
| 6,841,259 | B1 | * | 1/2005 | Takahashi et al. .......... 428/812 |
| 2001/0038932 | A1 | | 11/2001 | Uwazumi et al. | 
| 2002/0127433 | A1 | | 9/2002 | Shimizu et al. |

FOREIGN PATENT DOCUMENTS

JP 2001-155322 A 11/1999

* cited by examiner

*Primary Examiner*—Alain L. Bashore
(74) *Attorney, Agent, or Firm*—Reed Smith LLP; Stanley P. Fisher, Esq.; Juan Carlos A. Marquez, Esq.

(57) ABSTRACT

Provided are a double-layer perpendicular magnetic recording medium having a high medium S/N at an areal recording density of 50 Gbits or more per square inch, and a magnetic storage apparatus having excellent reliability with a low error rate. The perpendicular magnetic recording medium is formed by sequentially laminating a domain control layer, an amorphous soft magnetic underlayer, an intermediate layer, and a perpendicular recording layer on a substrate. The domain control layer is a triple-layer film formed by laminating a first polycrystalline soft magnetic layer, a disordered antiferromagnetic layer, and a second polycrystalline soft magnetic layer from a substrate side.

4 Claims, 10 Drawing Sheets

RADIAL DIRECTION OF DISK

MAGNIFIED GRAPH CORRESPONDING THE CIRCLE IN FIG.4A

CIRCUMFERENTIAL DIRECTION OF DISK

PERPENDICULAR MAGNETIC RECORDING MEDIA, MANUFACTURING PROCESS OF THE SAME, AND MAGNETIC STORAGE APPARATUS USING THE SAME

This application is a Continuation of nonprovisional U.S. application Ser. No. 10/076,655 filed on Feb. 19, 2002 now U.S. Pat. No. 6,723,457. Priority is claimed based on U.S. application Ser. No. 10/076,655 filed on Feb. 19, 2002, which claims the priority date of Japanese application No. 2001-143637 filed on May 14, 2001.

BACKGROUND OF THE INVENTION

The present invention relates to a magnetic recording medium and a magnetic storage apparatus, specifically to a magnetic recording medium having a recording density of 50 Gbits or more per square inch and to a magnetic storage apparatus incorporating the same.

In recent years, an areal recording density of a magnetic disk device as an external storage apparatus of a computer is increased by 100% per year. However, as the areal recording density is increased, a problem that data magnetically recorded is erased by circumferential heat, that is, a so-called thermal fluctuation, has become obvious. Accordingly, the conventional longitudinal recording method has been considered to be difficult to achieve the areal recording density exceeding 50 Gbits per square inch.

On the other hand, unlike the longitudinal recording method, a perpendicular recording method has a feature that, as a linear recording density is increased, a demagnetizing field acting between adjacent bits is decreased to stabilize recorded magnetization. Accordingly, the perpendicular recording method is considered to be one of the effective means for exceeding the thermal fluctuation limit of the longitudinal recording method.

In the perpendicular recording method, a combination of a single pole type head and a double-layer perpendicular medium composed of a soft magnetic underlayer and a perpendicular recording layer is effective in realizing high density recording. However, since the double-layer perpendicular medium includes the soft magnetic underlayer of a high saturation magnetic flux density (Bs), following problems have been pointed out: a stray field generated from domain walls of the soft magnetic underlayer is observed as spike noises, or recorded magnetization disappears by displacement of domain walls of the soft magnetic underlayer. As a method for solving these problems, for example as disclosed in Japanese Patent Laid-Open Nos. 07(1995)-129946 and 11(1999)-191217, it has been proposed that a hard magnetic pinning layer is provided between the soft magnetic layer and a substrate so that magnetization directions of the soft magnetic layer are aligned with one direction. As disclosed in Japanese Patent Laid-Open No. 06(1994)-103553, a method has been proposed, in which the displacement of domain walls of the soft magnetic layer is suppressed by an exchange coupling with an antiferromagnetic layer having magnetic spins aligned with each other.

However, in the method of aligning magnetization directions of the soft magnetic underlayer by use of the hard magnetic pinning layer, magnetic domains having an opposite magnetization direction are likely to be formed around inner and outer edges a disk substrate, and spike noises therefrom are observed. On the other hand, the method of suppressing the displacement of domain walls of the soft magnetic underlayer by use of the antiferromagnetic layer has an effect for preventing the disappearance of the recorded magnetization, which is caused by the displacement of domain walls, but cannot prevent the spike noises attributable to the domain walls.

SUMMARY OF THE INVENTION

The present invention is made to solve the above problems. Specifically, an object of the present invention is to provide a perpendicular magnetic recording medium having a recording density of 50 Gbits or more per square inch and a high medium SIN, which suppresses spike noises from the soft magnetic underlayer by a magnetic domain control layer and to provide a manufacturing process of the same, so as to facilitate realization of a high-density magnetic storage apparatus.

In the perpendicular magnetic recording medium including a domain control layer, an amorphous soft magnetic underlayer, and a perpendicular recording layer, which are sequentially formed on a substrate, the domain control layer is a triple-layer film including a first polycrystalline soft magnetic layer, a disordered antiferromagnetic layer, and a second polycrystalline soft magnetic layer, which are sequentially formed from a substrate side, so that domain control of the soft magnetic underlayer and reduction of medium noises can be achieved.

The inventors found out that the domain control layer as the above triple-layer film was effective as a result of investigation of various kinds of method for the domain control of the amorphous soft magnetic underlayer. Each of the first and the second polycrystalline soft magnetic layers is required to be capable of offering a soft magnetic property at a small film thickness and to have a good lattice matching with the disordered antiferromagnetic layer. Specifically, for the first and the second polycrystalline soft magnetic layers, a face-centered cubic (fcc) alloy mainly composed of Ni and Fe or an fcc alloy mainly composed of Co can be employed. Examples of these alloys include a $Ni_{81}Fe_{19}$ alloy, a $Ni_{80}Fe_{20}$ alloy, Co, and a $Co_{90}Fe_{10}$ alloy. Here, a numeral following a symbol of an element means a content of the element in atomic percent.

At formation of the disordered antiferromagnetic layer, an interlayer exchange coupling is necessary to act between the disordered antiferromagnetic layer and the first polycrystalline soft magnetic layer. Specifically, for the disordered antiferromagnetic layer, a disordered alloy mainly composed of Mn and Ir, or a disordered alloy mainly composed of Cr, Mn, and Pt can be employed. When the domain control layer is formed using such a material while applying a magnetic field having a component of a parallel direction to a surface of the substrate, a unidirectional magnetic anisotropy is induced in a direction of applying the magnetic field, so that the magnetization directions of the first and the second polycrystalline soft magnetic layer can be aligned with the direction of the applied magnetic field. Specifically, when the domain control layer using the above material is formed by a magnetron sputtering method, the magnetization directions of the first and the second polycrystalline soft magnetic layers can be aligned with a direction of a stray field from a cathode, that is, a radial direction of the disk substrate. As described above, the spike noises can be effectively suppressed by providing the domain control layer with a unidirectional magnetic anisotropy. On the other hand, since the ordered antiferromagnetic alloy such as a PtMn alloy and a NiMn alloy is generally in a disordered state at film formation, the exchange coupling does not act between the antiferromagnetic layer using such materials and the first polycrystalline soft magnetic layer. Accordingly, after the film formation, an ordering heat treatment is required for several hours while applying a magnetic field. Such a step is not desirable because a medium manufacturing process is made complicated and then costs are increased.

In the case of using the magnetron sputtering apparatus, the amorphous soft magnetic underlayer is provided with a uniaxial magnetic anisotropy having an easy axis of magnetization along the radial direction of the disk substrate during the medium manufacturing process. In the case where the domain control layer is not provided, several spoke-like 180° domain walls exist on the disk substrate so as to lower magnetostatic energy. By using the domain control layer of the present invention, the exchange coupling acts between the second polycrystalline soft magnetic layer and the amorphous soft magnetic underlayer, so that the amorphous soft magnetic underlayer is provided with the unidirectional magnetic anisotropy having the easy direction of magnetization aligned with the magnetization direction of the second polycrystalline soft magnetic layer. Accordingly, the spoke-like domain walls can be removed except the inner and outer edges of the disk substrate. Since magnetic poles are formed at the edges of the disk substrate, magnetic domains are formed so as to lower magnetostatic energy. However, in the medium of the present invention, an area having the magnetic domains formed thereon can be suppressed within areas of 1 mm from the edges of the disk substrate, that is, areas other than a data area. As a film thickness of the amorphous soft magnetic underlayer is increased, the exchange coupling force from the domain control layer is relatively decreased, so that the domain formation area around the edges of the disk substrate is expanded. In such a case, the amorphous soft magnetic underlayer is divided into two layers, and the domain control layer is inserted therebetween, thus reducing the domain formation area around the edges of the disk substrate. A material of the amorphous soft magnetic underlayer is not particularly limited, as long as the material is an amorphous alloy having Bs at least not less than 1 tesla (T), having an excellent surface flatness, and not crystallizing in the medium manufacturing process. Specifically, an amorphous alloy, which is mainly composed of Fe or Co and to which Ta, Hf, Nb, Zr, Si, B, or the like are added, can be employed.

For the intermediate layer used in the perpendicular recording medium of the present invention, a nonmagnetic alloy, which is amorphous or has a hexagonal closed packed (hcp) structure, can be employed. For the perpendicular recording layer, a CoCrPt alloy, a Co/Pd multilayer film, a Co/Pt multilayer film, or the like can be employed. In particular, since each of the Co/Pd multilayer film and the Co/Pt multilayer film of a small thickness offers a high coercivity not less than 5 kOe, resolution can be improved.

As for a protective layer of the perpendicular recording layer, a film mainly composed of carbon is formed with a film thickness ranging from 3 nm to 10 nm, and a lubricating layer is further formed of perfluoroalkylpolyether or the like at a film thickness ranging from 1 nm to 10 nm, whereby the perpendicular magnetic recording medium, which has an excellent reliability, can be obtained.

A magnetic storage apparatus of the present invention includes the above-described perpendicular magnetic recording medium; a driving unit for driving the perpendicular magnetic recording medium in a recording direction; a magnetic head composed of a recording section and a reproducing section; a unit for relatively moving the magnetic head with respect to the perpendicular recording medium; and a recording and reproducing processing unit for inputting signals to the magnetic head and for reproducing output signals from the magnetic head. The reproducing section of the magnetic head is composed of a high sensitivity element utilizing a magnetoresistive effect or a tunneling magnetoresistive effect. Accordingly, the magnetic storage apparatus can be realized, which has an excellent reliability at the recording density of 50 Gbits or more per square inch.

DETAILED DESCRIPTION OF THE PREFERRED EMBODIMENTS

Next, description will be made for embodiments with reference to the accompanying drawings.

Embodiment 1

Figure 1:
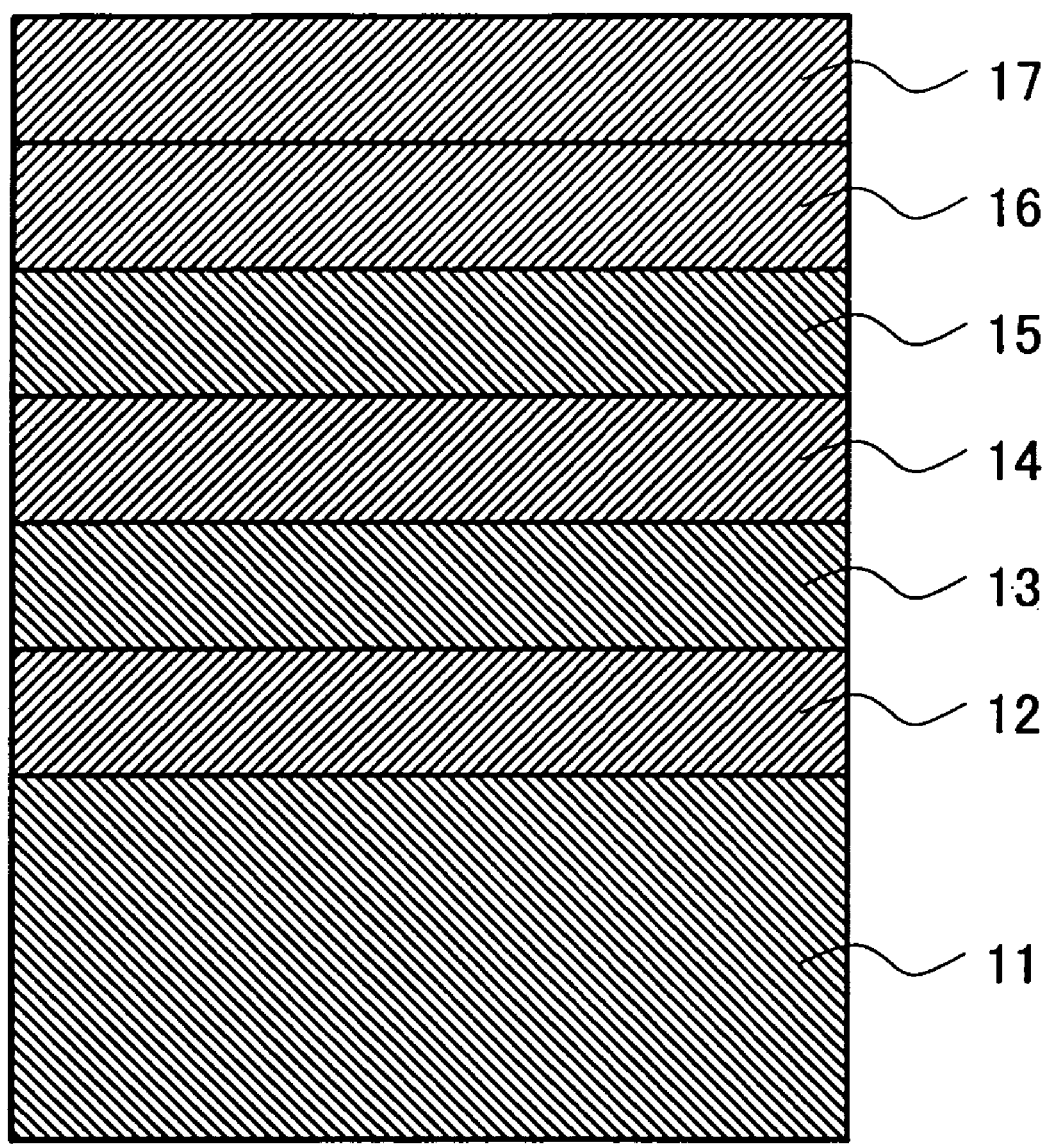
FIG. 1 is a view showing a layer structure of a perpendicular magnetic recording medium of an embodiment of the present invention.
Figure 2:
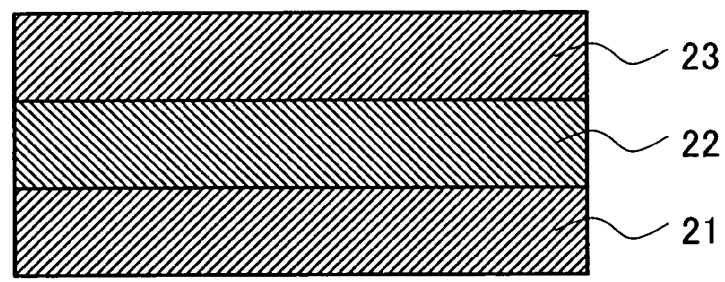
FIG. 2 is a view showing a layer structure of a domain control layer.

FIG. 1 shows a layer structure of a perpendicular recording medium of the embodiment. A 2.5-inch glass disk subjected to alkaline cleaning was employed as a substrate 11. On the substrate 11, sequentially deposited were a domain control layer 12, an amorphous soft magnetic underlayer 13, an intermediate layer 14, a perpendicular recording layer 15, and a protective layer 16 by a DC magnetron sputtering method. As shown in FIG. 2, the domain control layer 12 was a triple-layer film constituted of a first polycrystalline soft magnetic layer 21, a disordered antiferromagnetic layer 22, and a second polycrystalline soft magnetic layer 23. A target used for the preparation of each of the layers and a film thickness thereof are shown in Table 1. For the disordered antiferromagnetic layer, a MnIr alloy or a CrMnPt alloy was employed.

Table 1

|  | Target composition (at %) | Film thickness (nm) |
|---|---|---|
| First polycrystalline soft magnetic layer | $Ni_{81}Fe_{19}$ | 5 |
| Disordered antiferromagnetic layer | $Mn_{80}Ir_{20}$ | 2–50 |
|  | $Cr_{48}Mn_{48}Pt_4$ | 15–50 |
| Second polycrystalline soft magnetic layer | $Ni_{81}Fe_{19}$ | 5 |
| Amorphous soft magnetic underlayer | $Co_{92}Ta_3Zr_5$ | 50–200 |
| Intermediate layer | $Ni_{52.5}Ta_{37.5}Zr_{10}$ | 5 |
| Perpendicular recording layer | $Co_{64}Cr_{22}Pt_{14}$ | 20 |
| Protective layer | Carbon | 5 |

Figure 3:
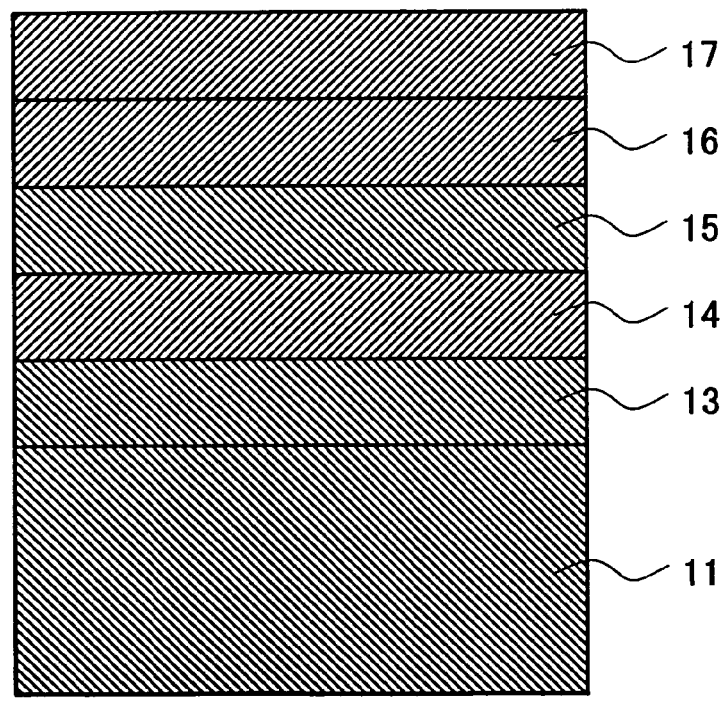
FIG. 3 is a view showing a layer structure of a perpendicular magnetic recording medium of a comparison.

The amorphous soft magnetic underlayer 12 was formed under a process condition in film preparation that Ar gas pressure was 0.5 Pa, and then the substrate was heated by a lamp heater. At the formation of the intermediate layer 14, a substrate temperature was about 250° C. The lubricating layer 17 was formed by coating a perfluoroalkylpolyether type material diluted with a fluorocarbon material. As a comparison, a medium without the domain control layer, as shown in FIG. 3, was prepared under the same process conditions in film preparation as those in the embodiment.

Figure 4A:
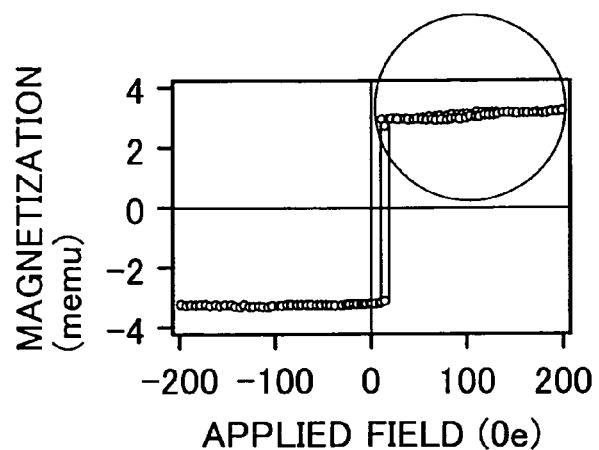
FIGS. 4A to 4C are views showing magnetization curves of an amorphous soft magnetic underlayer.
Figure 4B:
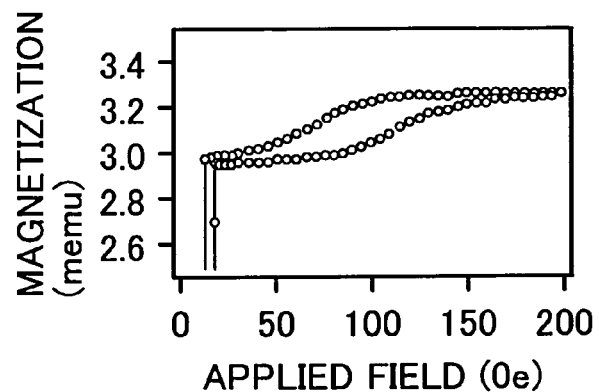
Figure 4C:
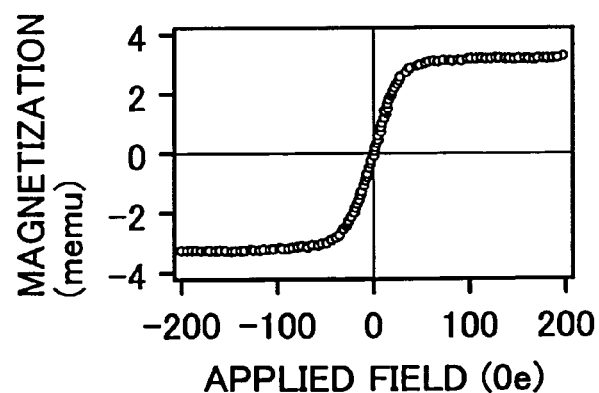

In order to evaluate magnetic properties of the amorphous soft magnetic underlayer of the embodiment, magnetization curves were measured by using a vibrating sample magnetometer (VSM), where a sample of 8 mm square cut out from the disk substrate was used. An example thereof is shown in FIGS. 4A to 4C. The magnetization curve (FIG. 4A) measured by applying a magnetic field along the radial direction of the disk substrate has a narrow range of the applied field for magnetization reversal, and a shift of the magnetization curve is seen along the direction of the magnetic field. Here, the magnetic field and the magnetization from the inner circumference toward the outer circumference in the radial direction of the disk substrate are shown as positive values. By magnifying a circle portion of FIG. 4A, hysteresis is seen (FIG. 4B), and the portion corresponds to a magnetization curve of the first polycrystalline soft magnetic layer of the domain control layer. On the other hand, in the magnetization curve (FIG. 4C) measured by applying a magnetic field along the circumferential direction of the disk substrate, the magnetization is substantially linearly changed, and a shift of the magnetization curve is not seen along the direction of the magnetic field. These results reveal that the amorphous soft magnetic underlayer of the present invention is provided with a uniaxial magnetic anisotropy having an easy axis of magnetization along the radial direction of the disk substrate, and further provided with a unidirectional magnetic anisotropy having an easy direction of magnetization in a radial direction from the outer circumference toward the inner circumference.

Next, in order to examine a magnetic property distribution of the amorphous soft magnetic underlayer (film thickness: 50 nm) with respect to locations on the disk substrate, B-H curves were measured at 16 locations on the same circumference of the disk substrate by using a B-H tracer. Here, a magnetic field was applied along a radial direction of the disk substrate. In Table 2, exchange bias fields Hex and coercivities Hc of the amorphous soft magnetic underlayer are shown. Here, Hex is a shift amount of the B-H curve along the direction of the magnetic field.

TABLE 2

| Location on disk substrate | Angle (deg) | Hex (Oe) | Hc (Oe) |
|---|---|---|---|
| 1 | 0 | 19.7 | 2.6 |
| 2 | 22.5 | 20.1 | 2.4 |
| 3 | 45.0 | 20.3 | 2.3 |
| 4 | 67.5 | 20.3 | 2.5 |
| 5 | 90.0 | 20.6 | 2.3 |
| 6 | 112.5 | 20.2 | 2.2 |
| 7 | 135.0 | 20.4 | 2.4 |
| 8 | 157.5 | 20.2 | 2.6 |
| 9 | 180.0 | 20.1 | 2.3 |
| 10 | 202.5 | 20.1 | 2.5 |
| 11 | 225.0 | 20.3 | 2.3 |
| 12 | 247.5 | 19.9 | 2.1 |
| 13 | 270.0 | 19.9 | 2.3 |
| 14 | 292.5 | 20.1 | 2.6 |
| 15 | 315.0 | 20.3 | 2.4 |
| 16 | 337.5 | 20.1 | 2.3 |

Hex and Hc were changed a little depending on the measurement locations. In each of the B-H loops, the zero field axis was on the outside (the left side) of the portion having the hysteresis. In other words, the residual magnetization of the amorphous soft magnetic underlayer is considered to be substantially aligned in a radial direction from the outer circumference toward the inner circumference without depending on the locations in the disk substrate. Actually, when observation of the magnetic domains was carried out by a Bitter method, no clear domain walls could be observed in the disk substrate other than the edges thereof. It was confirmed that areas of the magnetic domains formed around the inner and outer edges of the disk were restricted within 1 mm from the disk edges.

Figure 5A:
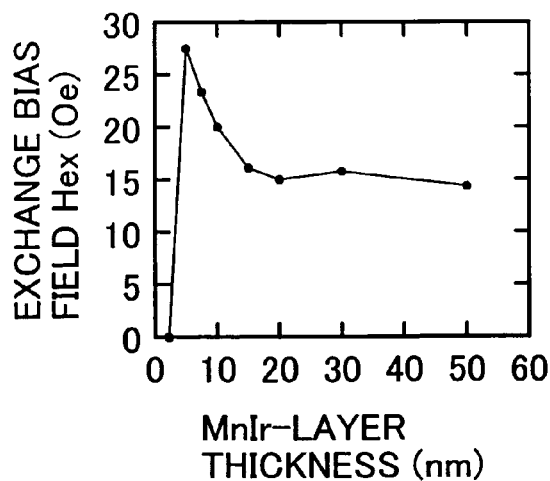
FIG. 5A is a view showing a relationship between an exchange bias field and a film thickness of an MnIr layer.
Figure 5B:
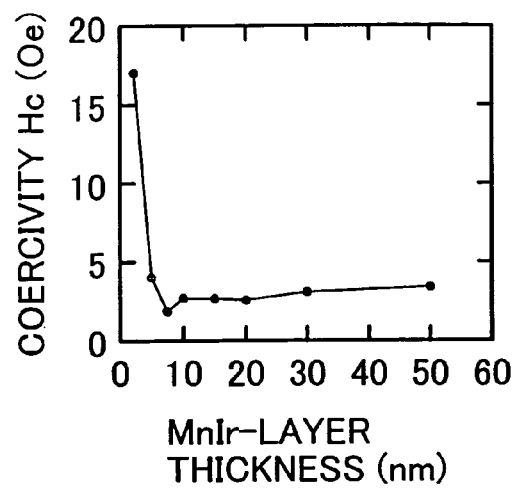
FIG. 5B is a view showing a relationship between a coercivity and the film thickness of the MnIr layer.
Figure 6A:
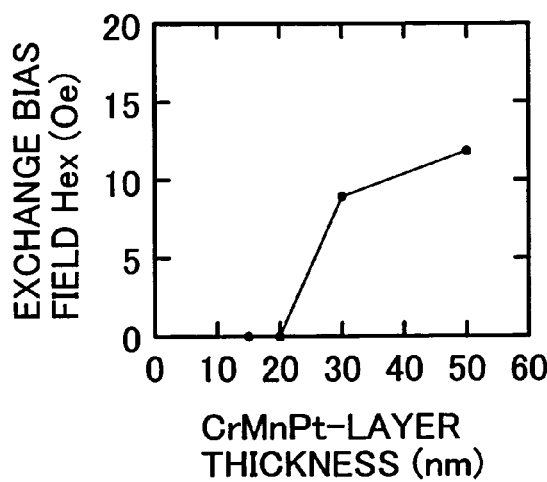
FIG. 6A is a view showing a relationship between an exchange bias field and a film thickness of a CrMnPt layer.
Figure 6B:
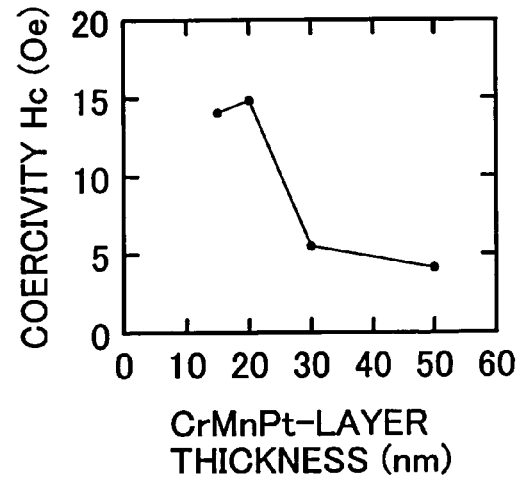
FIG. 6B is a view showing a relationship between a coercivity and the film thickness of the CrMnPt layer.

Next, effects of the film thickness of the disordered antiferromagnetic layer on magnetic properties of the amorphous soft magnetic underlayer (film thickness: 50 nm) were examined in such a manner that B-H curves were measured by applying a magnetic field along a radial direction, and the exchange bias field Hex and the coercivity Hc were evaluated. As shown in FIGS. 5A and 5B, in the case of using an MnIr alloy for the disordered antiferromagnetic layer, a large Hex can be obtained with a film thickness thereof as thin as 5 nm, and Hex is decreased with an increase in film thickness to be substantially constant with a film thickness of 15 nm or more. Hc is considerably increased in the case of a film thickness of 2 nm, but is decreased to be sufficiently lower than Hex with a film thickness of 5 nm or more. On the other hand, as shown in FIGS. 6A and 6B, in the case of using a CrMnPt alloy for the disordered antiferromagnetic layer, the magnetization curve is shifted with a film thickness of 30 nm or more, and then Hc is decreased in accordance with the shift of the magnetization curve. From these results, it is considered that, in order to control the magnetic domains of the amorphous soft magnetic underlayer, the disordered antiferromagnetic layer is required to have a film thickness of at least about 5 nm in the case of the MnIr alloy or at least about 30 nm in the case of the CrMnPt alloy.

Figure 7:
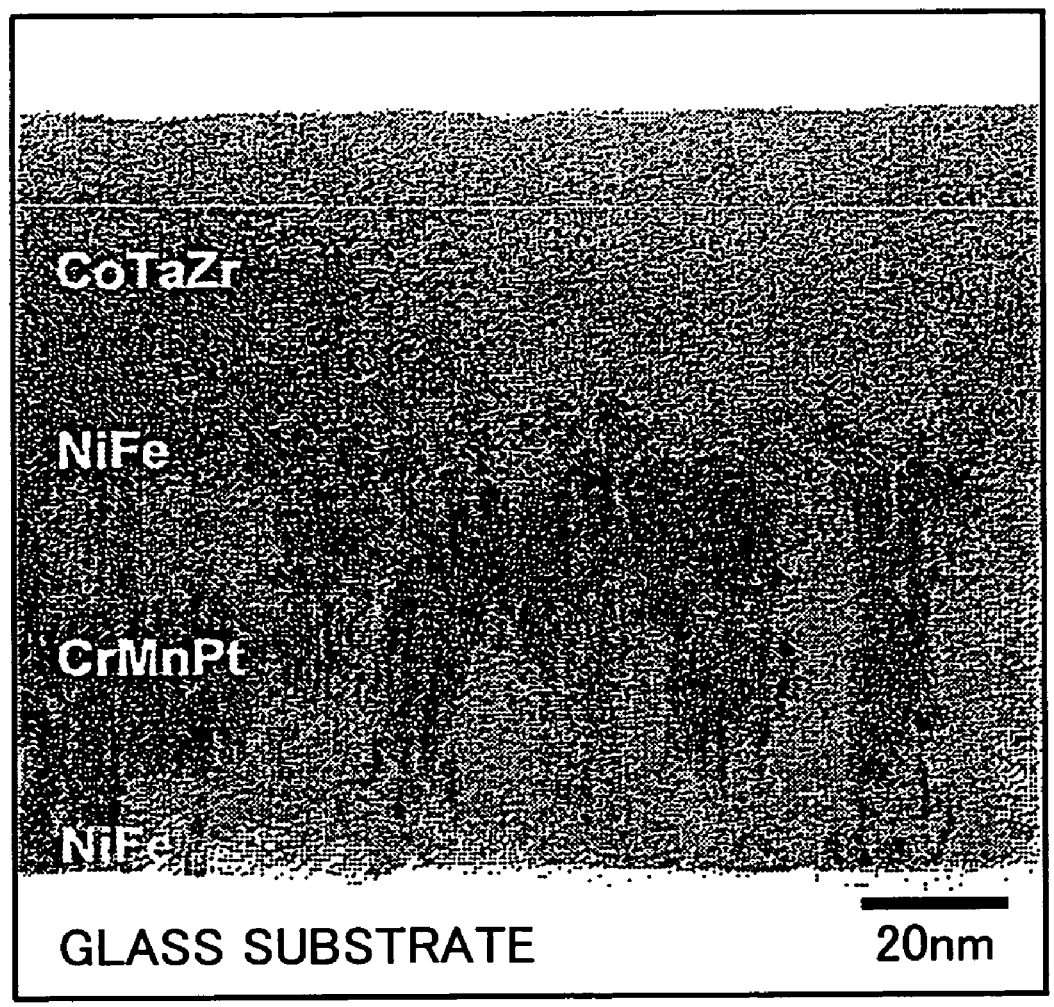
FIG. 7 is a cross-sectional TEM image of a section of the domain control layer and the amorphous soft magnetic underlayer.

FIG. 7 shows a transmission electron microscopy (TEM) image of the domain control layer and the amorphous soft magnetic underlayer in the case of using the CrMnPt alloy for the disordered antiferromagnetic layer. On the surface of the domain control layer, roughness of about 3 nm is seen, but the surface of the amorphous soft magnetic underlayer is comparatively flat, which comes from the fact that the soft magnetic underlayer is amorphous. Since the surface flatness of the soft magnetic underlayer gives an effect on crystal orientation of the perpendicular recording layer formed on the soft magnetic underlayer via the intermediate layer, the surface of the soft magnetic underlayer is desirably as flat as possible.

Figure 8:
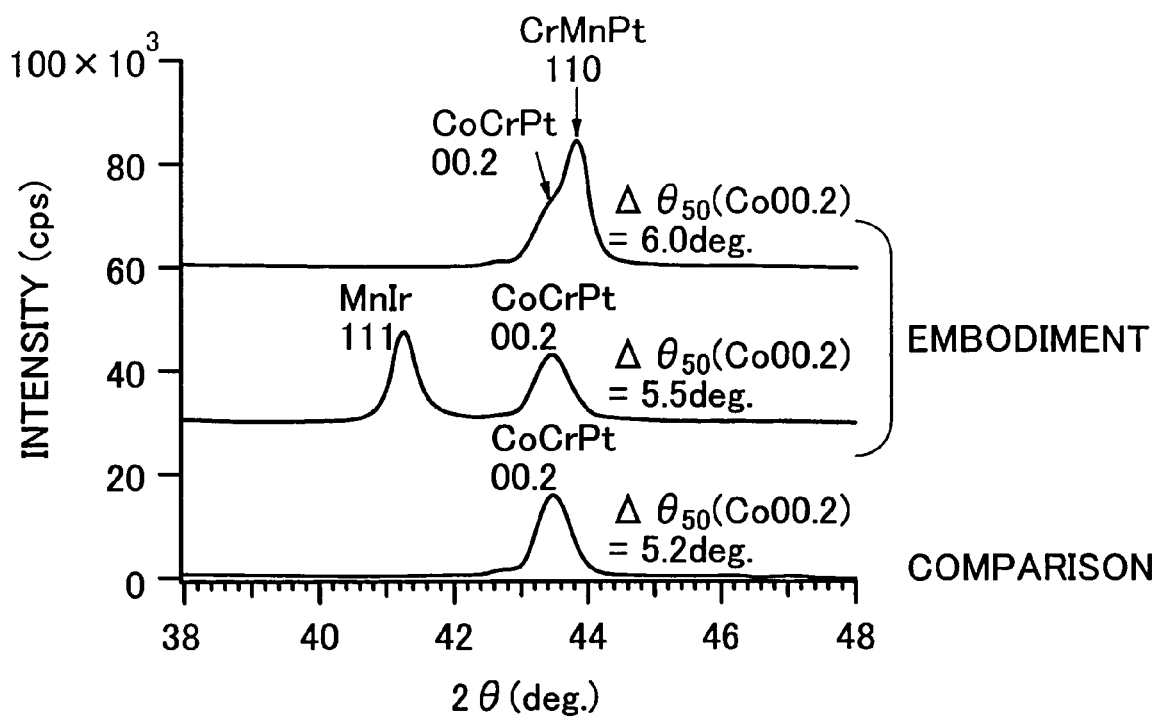
FIG. 8 is a view showing X-ray diffraction patterns of the perpendicular magnetic recording media.

FIG. 8 shows X-ray diffraction results of the media of the embodiment and the medium of the comparison without the domain control layer. Regarding the two patterns of the embodiments in FIG. 8, the upper pattern is an X-ray diffraction pattern of the medium using the CrMnPt alloy for the disordered antiferromagnetic layer, and the lower pattern is an X-ray diffraction pattern of the medium using the MnIr alloy for the disordered antiferromagnetic layer. $\Delta\theta_{50}$ of the embodiment obtained by rocking curves of CoCrPt (00.2) diffraction peaks, which provides an indication to c-axis vertical orientation of the perpendicular recording layer, are a little larger than that of the medium of the comparison. Accordingly, it is found that deterioration of the crystal orientation of the perpendicular recording layer by insertion of the domain control layer is small.

Next, spike noises in the media of the embodiment using the MnIr alloy for the disordered antiferromagnetic layer and in the media of the comparison are evaluated by use of a spin stand. The media of the embodiment including the soft magnetic underlayers ($Co_{92}Ta_3Zr_5$) having different film thicknesses of 50 nm, 100 nm, and 200 nm were prepared as media A, B, and C, respectively, and the media of the comparison including the soft magnetic underlayers ($Co_{92}Ta_3Zr_5$) having different film thicknesses of 50 nm, 100 nm, and 200 nm were prepared as media D, E, and F, respectively. In Table 3, the exchange bias field Hex and the coercivity Hc of the amorphous soft magnetic underlayer, and the number of spike noises per one round of the disk are shown for each medium.

TABLE 3

| | | Film thickness of soft magnetic underlayer (nm) | Hex (Oe) | Hc (Oe) | Number of spike noises |
|---|---|---|---|---|---|
| Embodiment 1 | Medium A | 50 | 20.6 | 2.3 | None |
| | Medium B | 100 | 9.8 | 1.9 | None |
| | Medium C | 200 | 5.1 | 0.8 | 1 |
| Comparison | Medium D | 50 | 0 | 1.7 | Not less than 20 |
| | Medium E | 100 | 0 | 1.6 | Not less than 20 |
| | Medium F | 200 | 0 | 0.6 | 6 |

In the media of the comparison without the domain control layer, a lot of large spike noises were observed in one round of the disk. When the radial location for the observation was changed, the spike noises were observed at the substantially same circumferential locations. Accordingly, it is found that spoke-like 180° domain walls exist in the disk. On the other hand, in the media of the embodiment with the domain control layers, one spike noise was observed in the inner circumferential portion only in the case where the amorphous soft magnetic underlayer had a thickness of 200 nm. However, in the case of the amorphous soft magnetic underlayers having thicknesses of 100 nm and 50 nm, no spike noises were observed over the entire surface of the disk. Therefore, by using the domain control layer of the present invention, the magnetic domains of the amorphous soft magnetic underlayer can be allowed to be a quasi-single magnetic domain during the medium forming process, thus making it possible to considerably suppress the spike noises.

Embodiment 2

Figure 9:
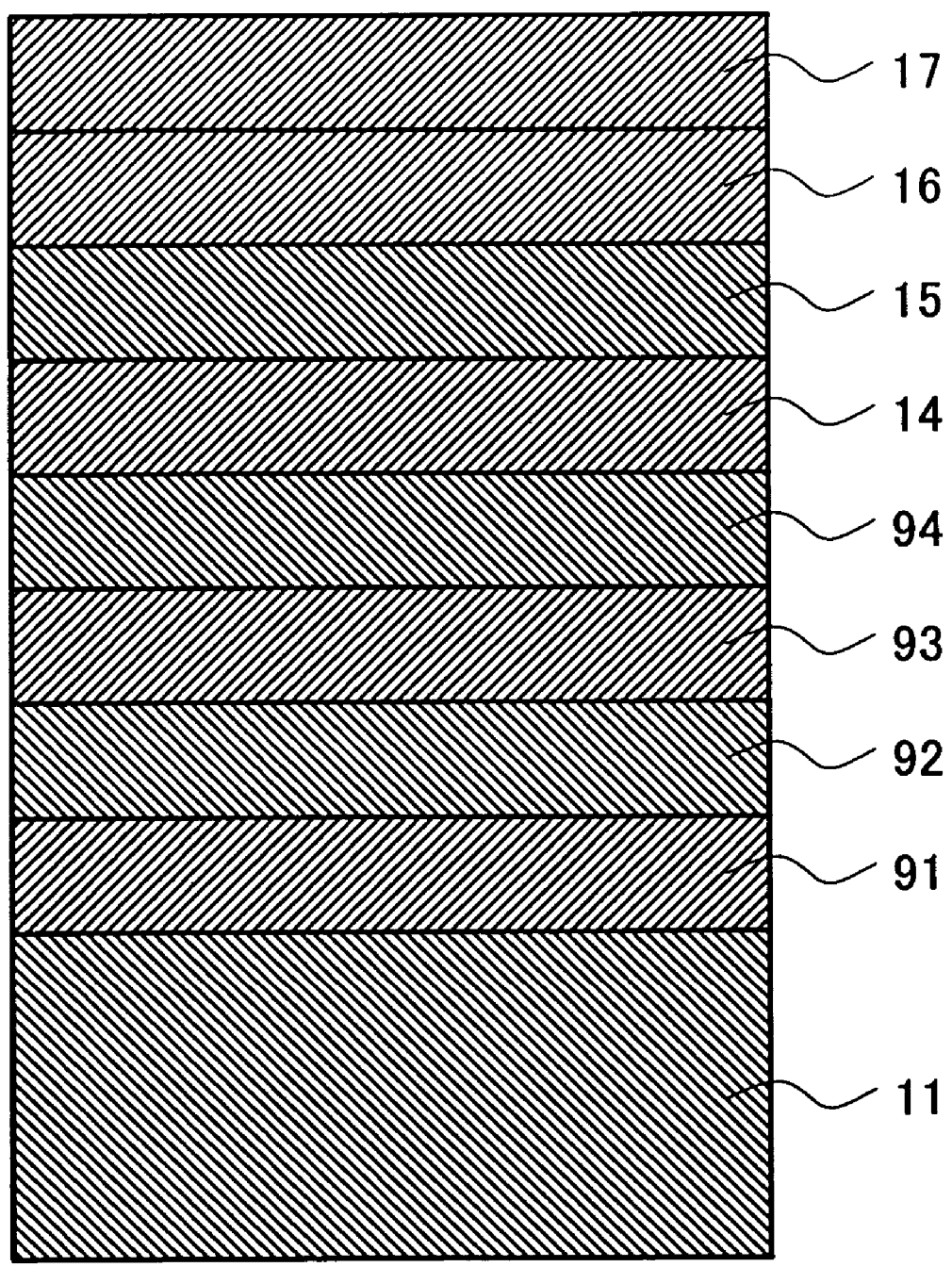
FIG. 9 is a view showing a layer structure of a perpendicular magnetic recording medium of an embodiment of the present invention.

FIG. 9 shows a layer structure of a perpendicular recording medium of the embodiment. A 2.5-inch glass substrate 11 subjected to alkaline cleaning was employed as the substrate 11. On the substrate 11, sequentially deposited were a domain control layer 91, an amorphous soft magnetic underlayer 92, a domain control layer 93, an amorphous soft magnetic underlayer 94, the intermediate layer 14, the perpendicular recording layer 15, and the protective layer 16 by the DC magnetron sputtering method. Each of the domain control layers 91 and 93 was a triple-layer film constituted of the first polycrystalline soft magnetic layer 21, the disordered antiferromagnetic layer 22, and the second polycrystalline soft magnetic layer 23 as shown in FIG. 2. A target used for the preparation of each of the layers and a thickness thereof are shown in Table 4. The amorphous soft magnetic underlayer 12 was formed under a process condition in film preparation that Ar gas pressure was 0.5 Pa, and then the substrate was heated by a lamp heater. During the formation of the intermediate layer 14, a substrate temperature was about 250° C. The lubricating layer 17 was formed by coating a perfluoroalkylpolyether type material diluted with a fluorocarbon material.

TABLE 4

| | Target composition (at %) | Film thickness (nm) |
|---|---|---|
| First polycrystalline soft magnetic layer | $Ni_{81}Fe_{19}$ | 5 |
| | $Co_{90}Fe_{10}$ | 10 |
| Disordered antiferromagnetic layer | $Mn_{80}Ir_{20}$ | 10 |
| Second polycrystalline soft magnetic layer | $Ni_{81}Fe_{19}$ | 5 |
| | $Co_{90}Fe_{10}$ | 5 |
| Amorphous soft magnetic underlayer | $Co_{92}Ta_3Zr_5$ | 100/100 |
| Intermediate layer | $Ni_{52.5}Ta_{37.5}Zr_{10}$ | 5 |
| Perpendicular recording layer | $Co_{64}Cr_{22}Pt_{14}$ | 20 |
| Protective layer | Carbon | 5 |

Magnetic properties of the amorphous soft magnetic underlayer of the embodiment were evaluated by use of the B-H tracer. In Table 5, the exchange bias field Hex and the coercivity Hc were shown in each case of using $Ni_{81}Fe_{19}$ (medium G) and using $Co_{90}Fe_{10}$ (medium H) for the first and the second polycrystalline soft magnetic layers.

TABLE 5

| | | First and second polycrystalline soft magnetic layers | Hex (Oe) | Hc (Oe) | Number of spike noises |
|---|---|---|---|---|---|
| Embodiment 2 | Medium G | $Ni_{81}Fe_{19}$ | 12.5 | 0.7 | None |
| | Medium H | $Co_{90}Fe_{10}$ | 16.4 | 0.8 | None |

When the two amorphous soft magnetic underlayers were provided by interposing the domain control layer therebetween, Hex two times or more of and Hc equivalent to those in the case of using the single amorphous soft magnetic underlayer (Embodiment 1: medium C) were obtained. In the evaluation of the spike noises of the media of the embodiment by use of the spin stand, no spike noise was observed over the entire surface of the disk.

Figure 10:
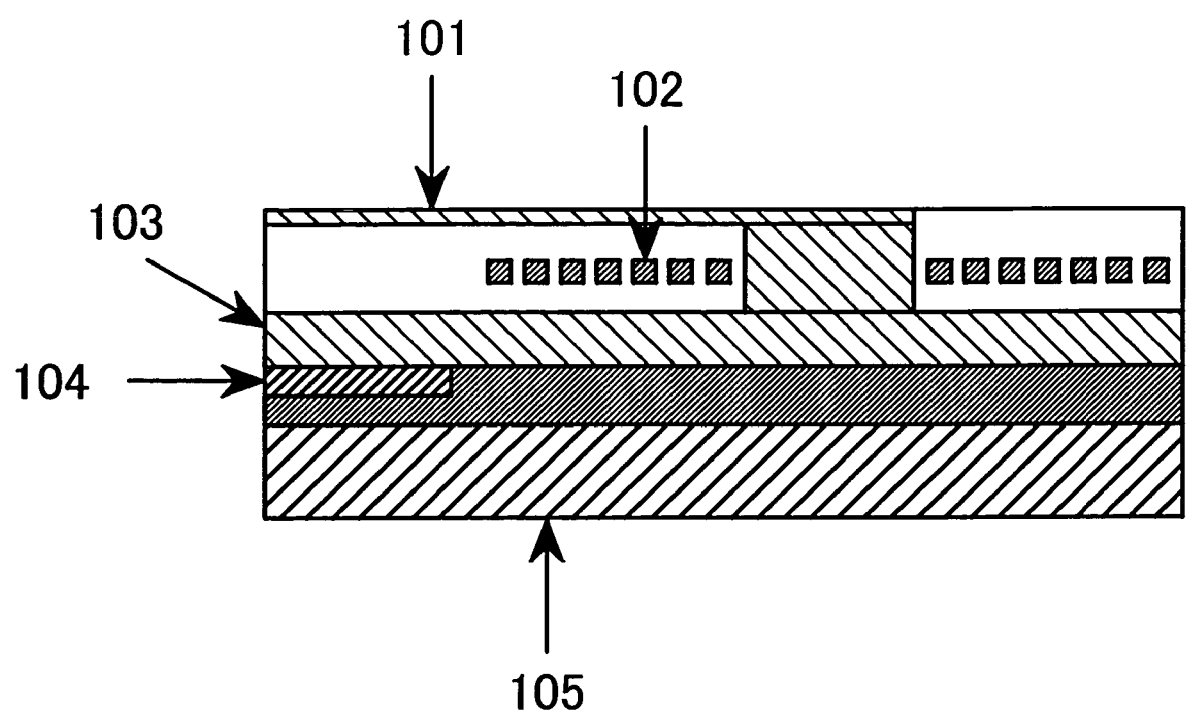
FIG. 10 is a schematic sectional view of a head which has a read element and a write element.

Recording and reproducing were carried out under the condition that a head flying height is 10 nm by use of the medium G of the embodiment, a single pole type head having a track width of 0.25 μm for recording, and a GMR head having a track width of 0.22 μm and a shield gap of 0.08 μm for reproducing. When a reproduced waveform of signals was passed through an EEPR4 series signal processing circuit for an error rate evaluation of the signals, an error rate of $10^{-6}$ or less was obtained under the condition that the areal recording density was 50 Gb/in². Note that a head which has a read element and a write element used in the evaluation has a known constitution composed of a main pole 101, a recording coil 102, an auxiliary pole/upper shield 103, a GMR element 104, and a lower shield 105 as shown in FIG. 10.

Embodiment 3

Figure 11A:
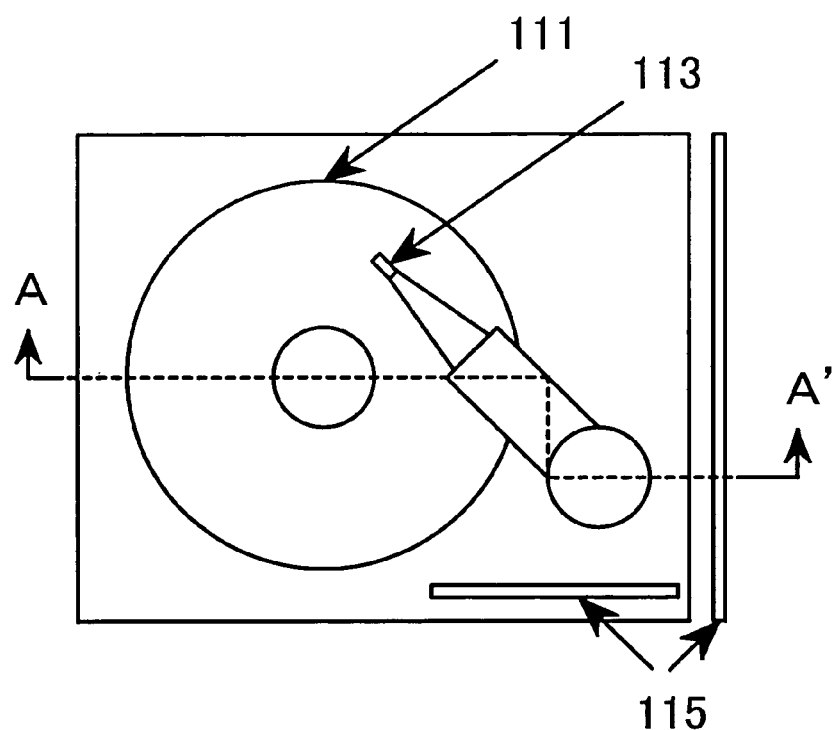
FIG. 11A is a schematic plan view of a magnetic storage apparatus of an embodiment of the present invention.
Figure 11B:
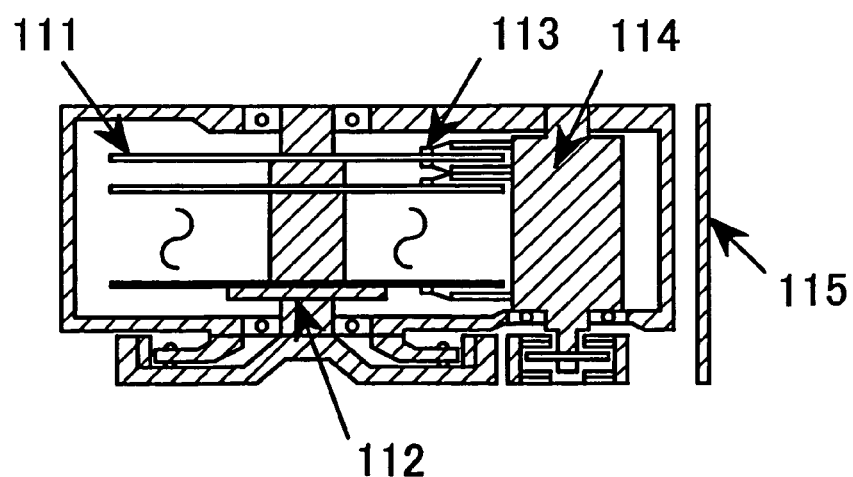
FIG. 11B is a longitudinal sectional view taken along a line A–A' of FIG. 11A.
Figure 12:
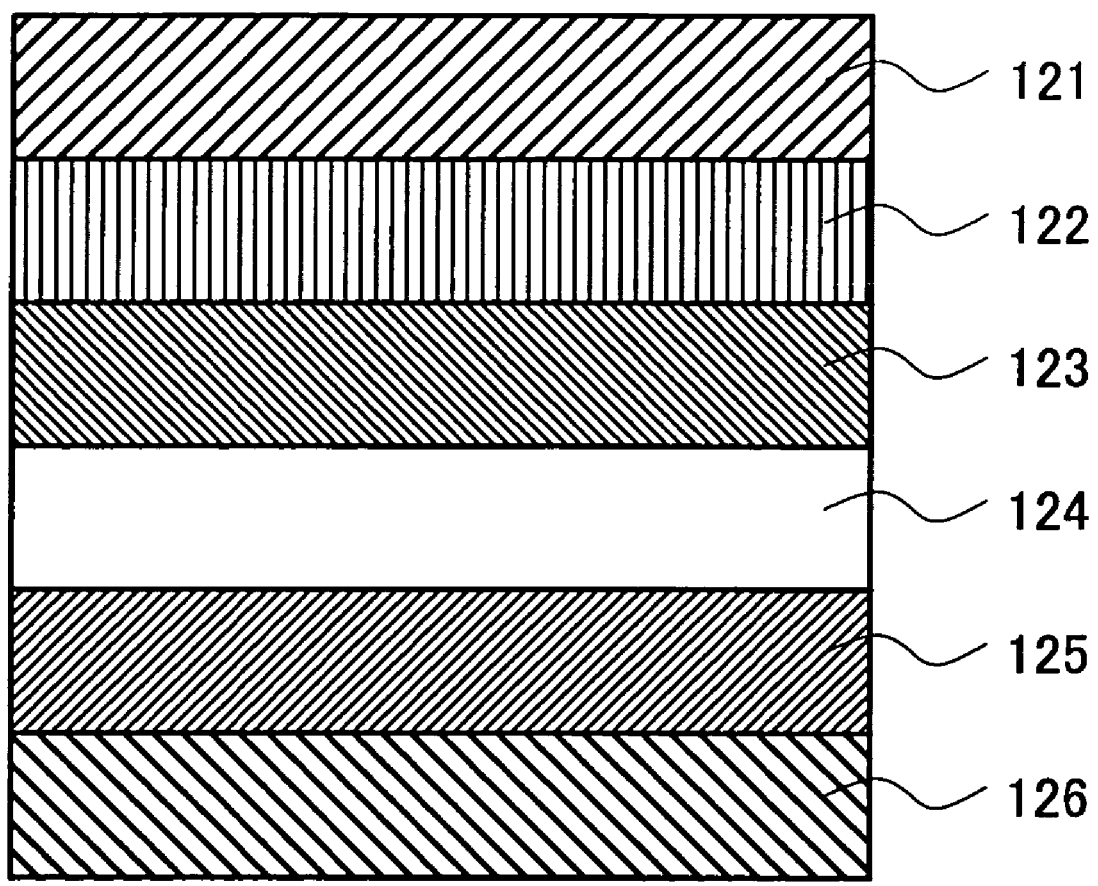
FIG. 12 is a view showing a layer structure of a high sensitivity element utilizing a tunneling magnetoresistive effect.

Description will be made for a magnetic storage apparatus according to the present invention with reference to FIGS. 11A and 11B. FIG. 11A is a schematic plan view of the apparatus, and FIG. 11B is a sectional view taken along a line A–A' of FIG. 11A. The magnetic storage apparatus has a known constitution composed of a perpendicular magnetic recording medium 111; a driving section 112 for rotationally driving the perpendicular magnetic recording medium 111; a magnetic head 113; a driving unit 114 for driving the magnetic head 113; and a recording/reproducing signal processing unit 115 for inputting/reproducing signals into/from the magnetic head 113. The magnetic head 113 is a head which has a read element and a write element formed on a magnetic head slider. The single pole type recording head has a track width of 0.25 μm, and the GMR head for reproducing has a shield gap of 0.08 μm and a track width of 0.22 μm.

A recording/reproducing property was evaluated by incorporating the medium G of the embodiment 2 into the above magnetic storage apparatus under the following conditions: a head flying height of 10 nm; a linear recording density of 590 kBPI; and a track density of 89 kTPI. The magnetic storage apparatus fully satisfied a recording/reproducing property specification at an areal recording density of 52.5 Gb/in² in a temperature range from 10° C. to 50° C.

Embodiment 4

The medium H of the embodiment 2 was incorporated in a magnetic storage apparatus using a high sensitivity element utilizing a tunneling magnetoresistive effect, which has a similar constitution to the magnetic storage apparatus of the embodiment 3. The recording/reproducing property was evaluated under the following conditions: a head flying height of 10 nm; a linear recording density of 674 kBPI; and a track density of 89 kTPI. The magnetic storage apparatus fully satisfied a recording/reproducing property specification at an areal recording density of 60 Gb/in² in a temperature range from 10° C. to 50° C. Specifically, the high sensitivity element utilizing a tunneling magnetoresistive effect, which was used in the evaluation, has a known constitution composed of an upper electrode 121, an antiferromagnetic layer 122, a pinned layer 123, an insulating layer 124, a free layer 125, and a lower electrode 126.

A manufacturing process of a perpendicular magnetic recording medium according to the present invention comprises the steps of: forming a disordered antiferromagnetic layer on a substrate; forming a polycrystalline soft magnetic layer on the antiferromagnetic layer; and forming an amorphous soft magnetic layer on the polycrystalline soft magnetic layer; wherein said every steps are carried out while applying a magnetic field having a component parallel to a surface of the substrate. A direction of the magnetic field having a component parallel to the surface of the substrate is substantially parallel to a radial direction of the substrate.

The magnetic storage apparatus according to the present invention comprises: a perpendicular magnetic recording medium mentioned above; a driving section for driving the perpendicular magnetic recording medium in a recording direction; a magnetic head including a reproducing section and a recording section; a unit for relatively moving the magnetic head with respect to the perpendicular magnetic recording medium; and a recording and reproducing processing unit for inputting signals into said magnetic head and for reproducing output signals from the magnetic head, wherein said reproducing section of the magnetic head is composed of a high sensitivity element utilizing a magnetoresistive effect or a tunneling magnetoresistive effect, and said recording section of the magnetic head is composed of a single pole type head.

According to the present invention, the magnetic storage apparatus can be realized, which has an excellent reliability with a low error rate at an areal recording density of 50 Gbits or more per square inch.

What is claimed is:

1. A manufacturing process of a perpendicular magnetic recording medium comprising the steps of:
    forming a disordered antiferromagnetic layer on a substrate;
    forming a polycrystalline soft magnetic layer on the antiferromagnetic layer;
    and forming an amorphous soft magnetic layer on the polycrystalline soft magnetic layer;
    wherein said every steps are carried out while applying a magnetic field having a component parallel to a surface of the substrate.

2. The manufacturing process according to claim 1, wherein the direction of the magnetic field having a component parallel to the surface of the substrate is substantially parallel to a radial direction of the substrate.

3. The manufacturing process according to claim 1, further comprising:
    forming another polycrystalline soft magnetic layer on the substrate prior to the step of forming the antiferromagnetic layer.

4. The manufacturing process according to claim 3, wherein during the step of forming the disordered antiferromagnetic layer, an interlayer exchange coupling occurs between said another polycrystalline soft magnetic layer and the disordered antiferromagnetic layer.

* * * * *